US012572448B2

(12) United States Patent　　　　(10) Patent No.:　US 12,572,448 B2
Chatterjee et al.　　　　　　　　　　(45) **Date of Patent:　*Mar. 10, 2026**

(54) LEVERAGING CODE CHURN ANALYTICS TO OPTIMIZE SANITIZER PERFORMANCE

(71) Applicant: HEWLETT PACKARD ENTERPRISE DEVELOPMENT LP, Spring, TX (US)

(72) Inventors: Soumitra Chatterjee, Karnataka (IN); Ritanya Bhaskar Bharadwaj, Karnataka (IN); Veena Konnanath, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 203 days.

This patent is subject to a terminal disclaimer.

(21) Appl. No.: 18/361,424

(22) Filed: Jul. 28, 2023

(65) Prior Publication Data

US 2025/0036550 A1　　　Jan. 30, 2025

(51) Int. Cl.
*G06F 11/362*　　　(2025.01)
*G06F 8/41*　　　　(2018.01)

(52) U.S. Cl.
CPC .......... *G06F 11/3644* (2013.01); *G06F 8/433* (2013.01)

(58) Field of Classification Search
CPC ................................................ G06F 11/3644
See application file for complete search history.

(56) References Cited

U.S. PATENT DOCUMENTS

| | | | |
|---|---|---|---|
| 8,572,748 B2 | 10/2013 | Pistoia et al. | |
| 8,635,602 B2 | 1/2014 | Haviv et al. | |
| 8,667,584 B2 | 3/2014 | Berg et al. | |
| 8,769,696 B2 | 7/2014 | Pistoia et al. | |
| 8,898,776 B2 | 11/2014 | Molnar et al. | |
| 9,672,279 B1 * | 6/2017 | Cohen ..................... | G06F 16/35 |
| 9,690,945 B2 | 6/2017 | Tripp | |
| 9,892,021 B2 * | 2/2018 | Coyle ................... | G06F 11/362 |
| 10,255,046 B2 * | 4/2019 | Alexander ............... | G06F 8/33 |
| 10,789,362 B2 * | 9/2020 | Allen .................... | G06F 21/554 |
| 10,896,253 B2 * | 1/2021 | Liu ..................... | G06F 11/3612 |
| 10,915,639 B2 | 2/2021 | Hassanshahi et al. | |
| 11,061,811 B2 * | 7/2021 | Luss .................. | G06F 11/3692 |

(Continued)

FOREIGN PATENT DOCUMENTS

WO　　WO-2020080513 A1 *　4/2020　.......... G06F 11/3604

OTHER PUBLICATIONS

Österlund, Sebastian, et al. "{ParmeSan}: Sanitizer-guided greybox fuzzing." 29th USENIX Security Symposium (USENIX Security 20). 2020.*

(Continued)

*Primary Examiner* — Francisco J Aponte

(74) *Attorney, Agent, or Firm* — Sheppard Mullin Richter & Hampton LLP

(57)　　　　　　ABSTRACT

Systems and methods sanitize computer code. In particular, fragile portions of computer code are identified based on instances of bug/defect-related churn data associated with the computer code. A control flow graph representative of the computer code may be generated, the control flow graph including nodes and edges. Nodes whose source location falls within the reported fragile sections are identified, and may be flagged as being susceptible. Thereafter, a sanitizer is run on the flagged nodes.

15 Claims, 7 Drawing Sheets

(56) References Cited

U.S. PATENT DOCUMENTS

| | | | | |
|---|---|---|---|---|
| 11,175,897 | B1 * | 11/2021 | Deng | G06F 8/51 |
| 11,440,190 | B1 * | 9/2022 | Maggi | G06F 16/9027 |
| 11,474,819 | B1 * | 10/2022 | Kapoor | G06Q 10/0637 |
| 11,513,944 | B1 * | 11/2022 | Oguara | G06F 11/3692 |
| 11,822,673 | B2 * | 11/2023 | Araujo | H04L 63/1433 |
| 2014/0380283 | A1 * | 12/2014 | Hu | G06F 11/3636 |
| | | | | 717/132 |
| 2015/0363294 | A1 * | 12/2015 | Carback, III | G06F 8/70 |
| | | | | 717/132 |
| 2017/0132116 | A1 * | 5/2017 | Lopian | G06F 11/3684 |
| 2017/0315903 | A1 * | 11/2017 | David | G06F 8/73 |
| 2017/0344746 | A1 | 11/2017 | Tripp | |
| 2018/0024911 | A1 * | 1/2018 | Kruszewski | G06F 8/447 |
| | | | | 717/125 |
| 2018/0330102 | A1 | 11/2018 | Siman et al. | |
| 2019/0108342 | A1 * | 4/2019 | Conikee | G06F 21/577 |
| 2019/0180035 | A1 * | 6/2019 | Esperer | G06F 21/53 |
| 2020/0125475 | A1 * | 4/2020 | Iyer | G06F 8/75 |
| 2020/0125478 | A1 * | 4/2020 | Iyer | G06F 11/3698 |
| 2020/0394311 | A1 | 12/2020 | Li et al. | |
| 2021/0263728 | A1 * | 8/2021 | Farrier | G06F 17/18 |
| 2022/0114076 | A1 * | 4/2022 | Zhou | G06F 11/3608 |
| 2022/0253377 | A1 * | 8/2022 | Coutinho Moraes | |
| | | | | G06F 11/3696 |
| 2022/0261222 | A1 * | 8/2022 | Gopal | G06F 16/2246 |
| 2023/0004487 | A1 * | 1/2023 | Bitla | G06F 11/3466 |
| 2023/0025441 | A1 * | 1/2023 | Oguara | G06F 11/368 |
| 2024/0303075 | A1 | 9/2024 | Chatterjee et al. | |
| 2024/0338443 | A1 * | 10/2024 | Miller | G06F 21/566 |

OTHER PUBLICATIONS

Ahmadi, Mansour, et al. "Finding bugs using your own code: detecting functionally-similar yet inconsistent code." 30th USENIX security symposium (USENIX Security 21). 2021.*

Huang, Zhen, et al. "Talos: Neutralizing vulnerabilities with security workarounds for rapid response." 2016 IEEE Symposium on Security and Privacy (SP). IEEE, 2016.*

Le Goues, Claire, and Westley Weimer. "Measuring code quality to improve specification mining." IEEE Transactions on Software Engineering 38.1 (2011).*

Gjomemo, Rigel, et al. "Leveraging static analysis tools for improving usability of memory error sanitization compilers." 2016 IEEE International Conference on Software Quality, Reliability and Security (QRS). IEEE, 2016.*

Kaoudis, Kelly, Henrik Brodin, and Evan Sultanik. "Automatically detecting variability bugs through hybrid control and data flow analysis." 2023 IEEE Security and Privacy Workshops (SPW). IEEE, 2023.*

Zhu, Xiaogang, and Marcel Böhme. "Regression greybox fuzzing." Proceedings of the 2021 ACM SIGSAC Conference on Computer and Communications Security. 2021.*

Padmanabhuni, Bindu Madhavi. Auditing buffer overflow vulnerabilities using program analysis and data mining techniques. Diss. 2016.*

"Home · Angular", available on <https://angular.dev/>, 2010-2025, 5 pages.

"TensorFlow". available online at <https://web.archive.org/web/20151109150056/https://www.tensorflow.org/>, Nov. 9, 2015, 5 pages.

Github, "gcc-mirror/gcc", available online at <https://web.archive.org/web/20140808073827/https://github.com/gcc-mirror/gcc>, Aug. 8, 2014, 3 pages.

Github, "google / sanitizers", available online at <https://github.com/google/sanitizers/wiki>, Dec. 3, 2015, 3 pages.

Jens Weller, "Meeting C++ survey results: C++ Tooling", Apr. 15, 2021, 4 pages.

Jira et al., "Atlassian named a Leader in the 2024 Gartner@ Magic Quadrant", available online at <https://www.atlassian.com/software/jira>, 2025, 16 pages.

LLVM Overview, "The LLVM Compiler Infrastructure", available online at <https://web.archive.org/web/20180309085928/https://llvm.org/>, Mar. 9, 2018, 3 pages.

Stephen Chong , CS153: Compilers Lecture 17: Control Flow Graph ? and Data Flow Analysis?, 2018, 24 pages.

Test Automation Resources, "7 Fundamental Principles of Software Testing", available online at <https://web.archive.org/web/20190926080130/https://testautomationresources.com/software-testing-basics/fundamental-principles-software-testing/>, Jan. 17, 2018, 5 pages.

Test Automation Resources, "All Things You Need To Know About Exhaustive Testing", available online at <https://web.archive.org/web/20200811061025/https://testautomationresources.com/software-testing-basics/exhaustive-testing-fundamentals/>, Nov. 7, 2018, 6 pages.

Wikipedia, "Code coverage", available online at <https://en.wikipedia.org/w/index.php?title=Code_coverage&oldid=1035573572>, Jul. 26, 2021, 7 Pages.

Wikipedia, "Dynamic program analysis", available online at <https://en.wikipedia.org/wiki/Dynamic_program_analysis>, Feb. 2009, 4 pages.

Wikipedia, "Instrumentation (computer programming)", available online at <https://en.wikipedia.org/wiki/Instrumentation_%28computer_programming%29>, Dec. 2013, 2 pages.

Zhang et al., "Debloating Address Sanitizer", 2022, 19 pages.

Zhang et al., "SANRAZOR: Reducing Redundant Sanitizer Checks in C/C++ Programs", 15th USENIX Symposium on Operating Systems Design and Implementation. Jul. 14-16, 2021, 17 pages.

* cited by examiner

200

| Source File | #Bugs | #RFEs | #Stori | #Sub-T | #Tasks | Total | %Bugs |
|---|---|---|---|---|---|---|---|
| llvm/lib/Analysis/LoopAutoThreadinf | 39 | 33 | 23 | 0 | 6 | 101 | 0.98 |
| llvm/lib/Analysis/MemoryStreamAnaly | 26 | 0 | 0 | 0 | 0 | 26 | 0.65 |
| llvm/lib/Analysis/RevealUtils.cpp | 25 | 8 | 13 | 0 | 5 | 51 | 0.63 |
| llvm/lib/Passes/PassBuilder.cpp | 23 | 10 | 1 | 0 | 2 | 36 | 0.58 |
| llvm/lib/Target/SelLowering.cpp | 22 | 42 | 0 | 1 | 1 | 66 | 0.55 |
| clang/lib/Driver/ToolChains/Clang.c | 18 | 21 | 2 | 0 | 1 | 42 | 0.45 |
| llvm/lib/Transforms/Vectorize/LoopV | 17 | 7 | 0 | 0 | 0 | 24 | 0.43 |
| llvm/include/llvm/Analysis/MemorySt | 17 | 0 | 0 | 0 | 0 | 17 | 0.43 |
| llvm/include/llvm/Analysis/LoopAuto | 16 | 19 | 14 | 0 | 3 | 52 | 0.4 |
| llvm/include/llvm/Analysis/RevealUt | 16 | 4 | 9 | 0 | 1 | 30 | 0.4 |
| clang/lib/Driver/Driver.cpp | 14 | 9 | 1 | 0 | 0 | 24 | 0.35 |
| llvm/lib/Transforms/Scalar/MemorySt | 14 | 2 | 0 | 0 | 0 | 16 | 0.35 |
| clang/lib/CodeGen/CGOpenMPRuntime.c | 13 | 10 | 1 | 0 | 0 | 24 | 0.33 |
| clang/lib/CodeGen/BackendUtil.cpp | 13 | 9 | 0 | 0 | 0 | 22 | 0.33 |
| clang/include/clang/Driver/Options. | 12 | 19 | 4 | 0 | 1 | 36 | 0.3 |
| clang/lib/Frontend/CompilerInvocati | 12 | 16 | 3 | 0 | 3 | 34 | 0.3 |
| llvm/include/llvm/InitializePasses. | 12 | 10 | 2 | 0 | 2 | 26 | 0.3 |
| llvm/lib/Passes/PassRegistry.def | 12 | 9 | 1 | 0 | 2 | 24 | 0.3 |
| llvm/lib/Analysis/RevealAliasAnalys | 12 | 0 | 6 | 0 | 2 | 20 | 0.3 |

| Line No. | #Commits | #Bugs | #RFEs | #Stories | #Tasks |
|---|---|---|---|---|---|
| 258 | 1 | 0 | 0 | 1 | 0 |
| 259 | 3 | 1 | 0 | 1 | 0 |
| 260 | 2 | 0 | 0 | 1 | 0 |
| 261 | 14 | 4 | 2 | 6 | 0 |
| 262 | 14 | 4 | 2 | 6 | 0 |
| 263 | 14 | 4 | 2 | 6 | 0 |
| 264 | 1 | 0 | 1 | 0 | 0 |
| 265 | 14 | 4 | 2 | 6 | 0 |
| 266 | 14 | 4 | 2 | 6 | 0 |
| 267 | 14 | 4 | 2 | 6 | 0 |
| 268 | 14 | 4 | 2 | 6 | 0 |
| 269 | 14 | 4 | 2 | 6 | 0 |
| 270 | 14 | 4 | 2 | 6 | 0 |
| 271 | 1 | 0 | 0 | 1 | 0 |

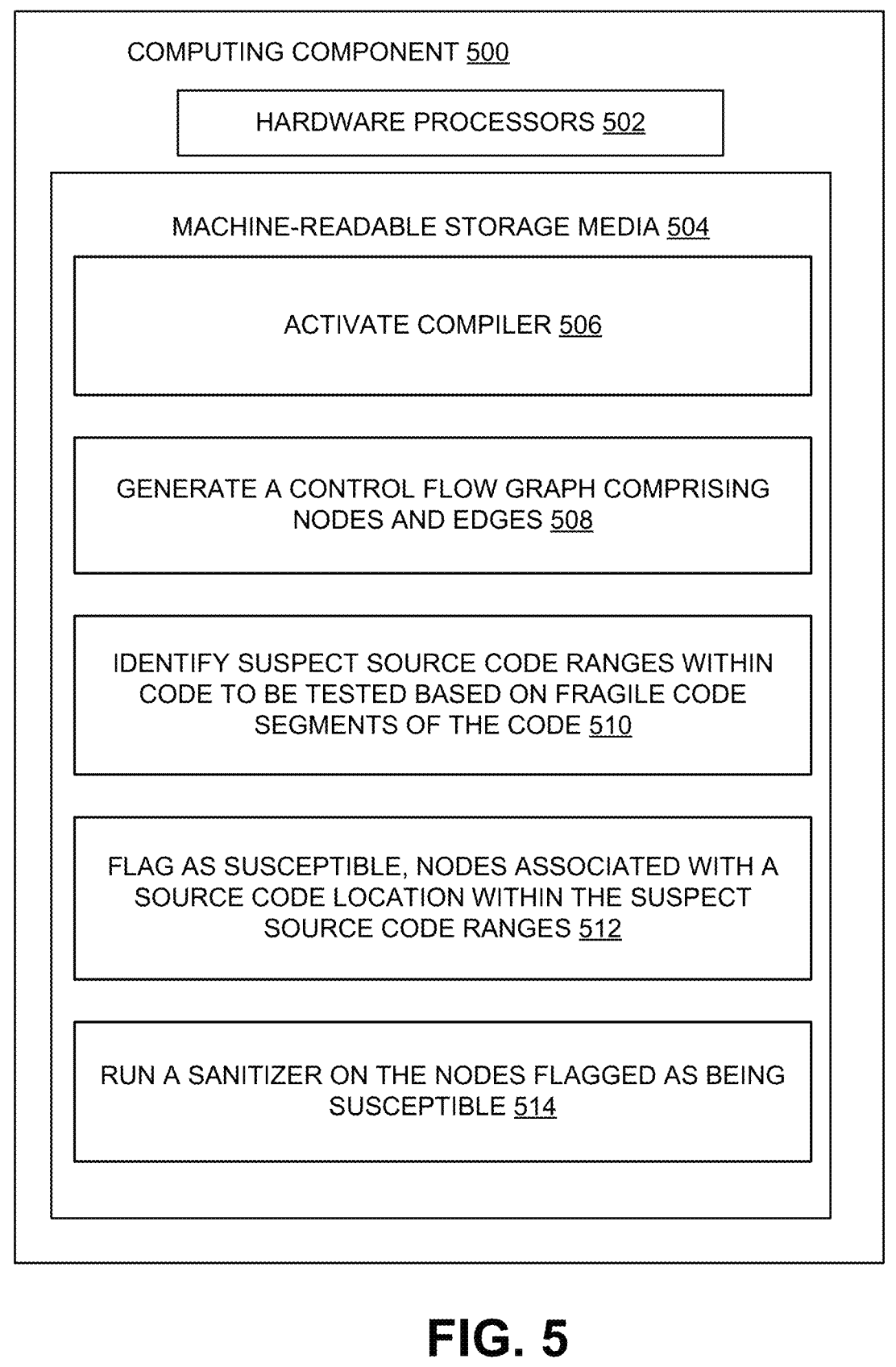

COMPUTING COMPONENT 500

HARDWARE PROCESSORS 502

MACHINE-READABLE STORAGE MEDIA 504

ACTIVATE COMPILER 506

GENERATE A CONTROL FLOW GRAPH COMPRISING NODES AND EDGES 508

IDENTIFY SUSPECT SOURCE CODE RANGES WITHIN CODE TO BE TESTED BASED ON FRAGILE CODE SEGMENTS OF THE CODE 510

FLAG AS SUSCEPTIBLE, NODES ASSOCIATED WITH A SOURCE CODE LOCATION WITHIN THE SUSPECT SOURCE CODE RANGES 512

RUN A SANITIZER ON THE NODES FLAGGED AS BEING SUSCEPTIBLE 514

FIG. 5

LEVERAGING CODE CHURN ANALYTICS TO OPTIMIZE SANITIZER PERFORMANCE

BACKGROUND

Dynamic program analysis tools are arguably one of the most effective mechanisms to combat software defects. These tools analyze computer code while the computer code is running, detecting errors that are otherwise undetectable unless analyzed in its "dynamic" state. The analysis often relies on sanitizer instrumentation (adding code to an application for performance analysis, data gathering/monitoring, etc.) to detect suspicious behavior in a data flow. Sanitizers are among the most popular type of dynamic program analysis tools. Despite their popularity, however, sanitizers can impose a prohibitively high runtime performance penalty, and in some instances, have been estimated to contribute to approximately 80% of overhead costs in a computing system. These high costs are typically due to code instrumentation, i.e. additional code is inserted into the code to dynamically (i.e. at runtime of application) analyze the code for every possible error, resulting in significant runtime overhead. Other solutions have been developed to combat runtime overhead, such as utilizing architecture-specific features and static analysis-based pruning to restrict the scope of sanitizer instrumentation.

BRIEF DESCRIPTION OF THE DRAWINGS

The present disclosure, in accordance with one or more various examples, is described in detail with reference to the following figures. The figures are provided for purposes of illustration only and merely depict typical or example examples.

FIG. 2 illustrates an example matrix reporting the number of bug/defect-related churn data instances by file name within a repository of source code in accordance with examples of the technology disclosed herein.

FIG. 5 illustrates an example computing device in accordance with examples of the technology disclosed herein.

Figure 1:
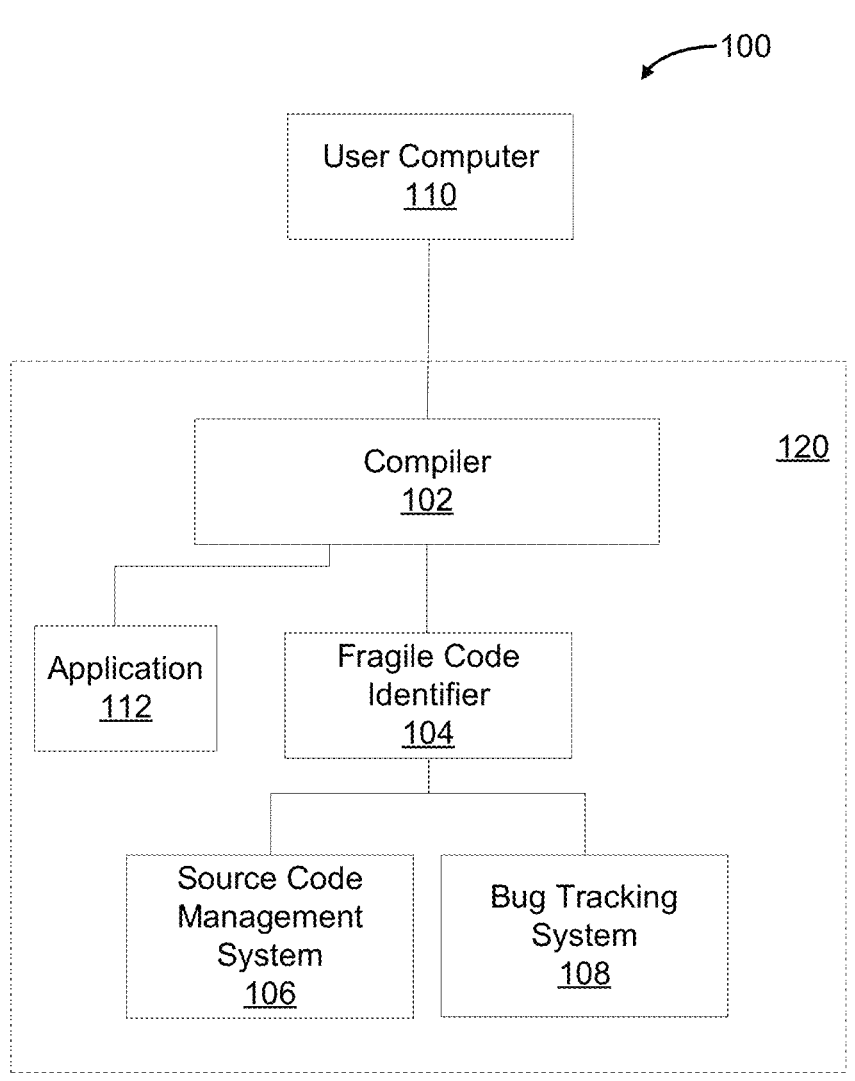
FIG. 1 illustrates, at a high level of generality, an environment with an integrated compiler in accordance with examples of the technology disclosed herein.

The figures are not exhaustive and do not limit the present disclosure to the precise form disclosed.

DETAILED DESCRIPTION

As alluded to above, significant runtime overhead can result from the use of software/computer code sanitizers due to high code instrumentation. Although some solutions attempt to combat overhead, typical improvement in overhead cost is limited, and the remaining overhead cost still inhibits widespread adoption of sanitizers. Moreover, on balance, the use of pruning techniques still increases the runtime/compile-time overhead as a result of performing the static analysis. Additionally, even slight changes to the code invalidates prior static analysis results, necessitating a repeat analysis, which can multiply the compile-time cost. Therefore, an effective solution will reduce code instrumentation while minimizing the impact on sanitizer effectiveness. One way to limit code instrumentation is through relying on code fragility data.

Code fragility can refer to the tendency for source code to "break," i.e., cause errors or faults, when the source code is changed. This trait can be narrowed to individual lines of code. This is possible because code fragility has been correlated with a high number of instances of code churn (also known as rework). Using the identified fragile sections of the code in conjunction with compiler operations, fragile nodes can be identified and flagged (where nodes in this context can refer to a control flow graph node, e.g., a basic block or "straight-line" piece of code without any jumps/jump targets). Moreover, the control flow (paths that may be traversed by a program during execution) passing through the identified/flagged node can be identified for sanitizer instrumentation. As a result, executing the code runs the sanitizer on the control flow passing through the flagged nodes. Because sanitizer instrumentation was conducted on the control flow passing through the fragile node, code instrumentation, and more widely, the runtime overhead cost of sanitizer use, are reduced.

As noted above, fragile code can be identified through instances of code churn (also known as rework). Code churn can refer to a measure or indication of how often a file (in this context, a source code file/file containing source code) changes or is edited. Software developers often correlate high churn data with fragile code and past studies have confirmed this correlation. Furthermore, the accuracy of fragile code detection can be improved through identifying/considering churn data associated with bug/defect correction, while ignoring churn data associated with feature additions, which is a benign factor in terms of code quality. It should be understood that the analysis alluded to above regarding fragile code identification, may be conducted at the source code level, and can be premised on the associated number of code churns. Reliance on code churn requires limited and simplified setup and is therefore cost-efficient. Additionally, and unlike conventional static analysis techniques, slight changes to the code do not invalidate prior analytical results. This is because the other techniques leverage identified faultless code, which can quickly become susceptible to faults through minor changes and necessitating a repeat operation of static analysis to confirm the modified code is faultless. In contrast, the method disclosed herein is not impacted by minor changes because the scope of the dynamic analysis is not based on a confirmed attribute (e.g., a faultless code), but instead on a probability of fragility identified through correlating the number of churns, i.e., a subjective analysis that does not conclude with absolute certainty. Thus, the method described herein focuses on sections of code that are considered to have a "high" number of experienced bug/defect-related instances of code churn, which may not be impacted by minor code changes, such as feature related (e.g., additions) code changes.

Accordingly, examples of the disclosed technology are directed to solutions rooted in computer technology to overcome the above-described issues with conventional sanitizer use. In particular, examples of the disclosed technology provide systems and methods for limiting the code instrumentation based on identified fragile sections of code, e.g., a report identifying fragile sections of code. The systems and methods disclosed herein may create a control flow graph comprising nodes and edges for code/some portion(s) of code. Concurrently, examples of the disclosed technology can obtain a list of fragile sections of code. Leveraging the reported fragile sections of code, nodes whose source location falls within the reported fragile sections are identified and may be flagged as being susceptible. Accordingly, any control flow that passes through the flagged nodes are treated as susceptible code flow and enabled for sanitizer instrumentation. The limited sanitizer instrumentation is added to the code, which may pass only instrumented code considered susceptible and marked eligible for the limited sanitizer instrumentation.

In some examples, the disclosed technology may identify fragile code segments based on the number of instances of bug/defect-related churn data. In some examples, the disclosed technology may identify fragile code segments based on the number of instances of bug/defect-related churn data which are calculated by the number of bug/defect-related commits. While churn data records represent rework of source code, commits are operations that send the source code's latest changes to the repository.

Examples of the disclosed technology may be implemented for use in various systems or environments. As alluded to above and as will be described in greater detail below, examples of the disclosed technology may comprise a compiler or compiling function that includes a sanitizer for instrumenting identified fragile code segments. Such a compiler/compiling function may be implemented as an application or function that can be executed locally or remotely from the code being compiled. The systems and methods disclosed herein may be implemented within any number of computing systems. For example, the systems and methods disclosed herein may be used within hardware, a hardwired system, a wirelessly connected system, or through the internet. In addition, the principles disclosed herein may also extend to other network types.

FIG. 1 illustrates, at a high level of generality, an environment 100 with an integrated compiler 102 in accordance with examples of the technology disclosed herein. The examples include compiler 102 that communicates with fragile code identifier 104. Fragile code identifier 104, in turn, may communicate with source code management system (SCM) 106 and bug tracking system (BTS) 108. In some examples, compiler 102 may communicate directly with SCM 106 or BTS 108 and may perform the functions performed by fragile code identifier 104 described below. Compiler 102, fragile code identifier 104, SCM 106, and BTS 108 may provide their respective services to user computers 110 typically over a network or through a wired connection(s) (a hashed area 120 represents this flexibility). In some examples, the respective services of compiler 102, fragile code identifier 104, SCM 106, and BTS 108 to user computers 110 may be through other means, such as shared memory and disk files. Although illustrated as if implemented at a single location, those skilled in the art will realize that integrated compiler 102, fragile code identifier 104, SCM 106 and BTS 108 can be implemented at a locally hosted computing facility or using distributed, cloud-based data center infrastructure. Depending on the implementation environment, the network can be a local area network or the Internet.

When active, compiler 102 may communicate with user computer 110 and fragile code identifier 104. Examples of the disclosed technology may operate in the context of a single computer or host for source code. Compiler 102 can be an application located on individual user computer 110 that performs the methods described herein in accordance with the principles of the present disclosure. Compiler 102 normally remains dormant until a user through user computer 110 prompts its activation. In some examples, a user can schedule periodic activation to prompt compiler 102 to automatically conduct its functions described in more detail below. The periodic activation may be user directed or may be preprogrammed. Activation may be daily, weekly, monthly, annually, or any other periods. Activation may also be based on events, such as upon a change to a repository of source code.

The activation of compiler 102 results in translating code from one language to another language, typically from a high/mid-level language (C++, Python) or human-readable source code to a low-level language or a machine code. High/mid-level languages contain strong abstraction from machine language and use natural (i.e., comprehensible by a human) language elements. In contrast, low-level language or a machine code provides little or no abstraction, i.e., commands or functions are structurally similar to processor's instruction. A compiling process includes a multitude of phases, which may include but are not limited to preprocessing, lexical analysis, parsing, semantic analysis, conversion of input programs to an intermediate representation, code optimization and machine-specific code generation. During a typical, intermediate representation phase, compiler 102 transforms the human-readable source code to a control flow graph comprising nodes and edges. Each node in the graph represents a basic block, i.e., a straight-line piece of code without any jumps to other nodes in the interim. Edges are used to represent jumps in the control flow. For example, execution of consecutive lines of code without "jumping", which includes examples such as two possible outcomes from an if condition, is referred to as a basic block. As described in more detail below, Compiler 102 or a separate application called by compiler 102, such as application 112, will flag fragile nodes and mark control flow as susceptible code flow. Using the flagged control flow graph, compiler 102 will continue through the remainder of phases to transform the original code while retaining the flagged nodes and control flow marked as susceptible code flows.

A sanitizer is a programming tool that helps compilers, such as compiler 102, recognize various issues at runtime/during code execution. An example of such a sanitizer tool is AddressSanitizer, but other sanitizer tools may be incorporated into a compiler and leveraged in accordance with various examples of the disclosed technology. Compiler 102 then instruments the code being compiled in accordance with the sanitizer, such that when executed, the sanitizer analyzes the instrumented code for certain abnormal behaviors. When used in a conventional manner, as noted above, and in contrast with examples of the disclosed technology, a sanitizer would look for abnormalities throughout an entire control flow.

In some examples, a separate application, such as application 112, may be activated by compiler 102 to assist with the methods described herein. For example, compiler 102 may rely on application 112 to build the instrumented code, wherein application 112 receives the flagged and marked control flow diagram and builds the code, instrumenting, in accordance with some examples, only the susceptible code flow marked for sanitizer instrumentation. In some examples, application 112 may also receive the control flow graph from compiler 102 and report from fragile code identifier 104, and flag the nodes and mark control flow as susceptible code flow within the control flow graph. It should be understood that while application 112 functionality can be implemented separately as its own component, it could also just be implemented in/as part of the compiler.

Fragile code identifier 104 can be an application located on user computer 110 that communicates with SCM 106 and BTS 108 to identify fragile segments of code. Fragile code identifier 104 normally remains dormant until a user, through user computer 110, prompts its activation. In some examples, a user can schedule periodic activation of fragile code identifier 104 to prompt fragile code identifier 104 to automatically conduct its functions described in more detail below. The periodic activation may be user directed or may be preprogrammed. Activation may be daily, weekly, monthly, annually, or any other periods. Activation may also be based on events, such as upon a change to a repository of source code.

SCM 106 may maintain repositories of source code and other data pertaining to individual software development projects. In the course of project development using an SCM 106, a user of user computer 110 may take certain actions with respect to a repository that result in events occurring in SCM 106. Information about these SCM-repository events may be stored in the repository along with the other information that may be relevant to document revisions made to the source code files as well as the general course of development pursuant to the project.

SCM 106 may include code churn information in the form of code churn metrics. The code churn metrics generally measure the interaction between programmers and the source code. The code churn metrics may include, but is not limited to the number of revisions to a file/method/class/ routine, the number of times a file has been refactored, which involves restructuring a code without changing or adding to its external behavior and functionality, the number of different authors that have touched a file/method/class/ routine, and the number of times a particular file/method/ class/routine has been involved in a bug-fixing. Additional code churn metrics may include the sum of all revisions of the lines of code added to file, the sum of all lines of code minus the deleted lines of code over all revisions, the maximum number of files committed together, and the age of file in weeks counted backwards from the release time. In some examples, and as further described in more detail below, SCM 106 may provide logs of commits established by programmers onto the source code. Information within logs of commits may include commit hashes, which are unique identifiers associated with individual commits, commit authors, commit dates, and commit messages written by the commit authors.

BTS 108 is a system that may contain code churn information that is different from the code churn information from SCM 106. This code churn information pertains more specifically to reported bugs or defects, whereas the code churn metrics or logs of commits represent records of interaction between programmers and the source code. The BTS 108 may be created using a variety of different architectures. As an example, a client server architecture is described below in which the BTS 108 functionality is provided by a server computer and accessed by users from user computers 110. For each bug that has been identified, BTS 108 may maintain a bug identifier token, a bug description, a title, the name of the person that found the bug, and an identifier of the component with the bug. BTS 108 may also maintain additional information regarding a bug such as the specific version release with the bug, the specific hardware platform with the bug, the date the bug was identified, a log of changes made to address the bug, the name of the developer and/or manager assigned to the bug, whether the bug is interesting to a customer, the priority of the bug, the severity of the bug, and/or other custom fields. The same information may be included when correcting a defect. When a particular bug tracked by BTS 108 is addressed by a programmer, the programmer may correlate the particular bug to a bug identifier token. SCM 106 may then update the associated information such as the log of changes made to address the bug and the specific code segments modified. Thus, the number of times a code section has been modified due to bug-fixing can be tracked. If a bug is associated with a new feature being added, the system may also provide a link to the feature in a feature tracking system.

When activated, fragile code identifier 104 may retrieve code churn information of source code from a repository of source code. The code churn information may include code churn metrics or logs of commits. The code churn metrics may include the number of revisions to a file/method/class/ routine, the number of times a file has been refactored, the number of different authors that have touched a file/method/ class/routine, and the number of times a particular file/ method/class/routine has been involved in a bug-fixing. Logs of commits may include commit hashes, which are unique identifiers associated with individual commits, commit authors, commit dates, and commit messages written by the commit authors. In some examples, fragile code identifier 104 may retrieve code churn information from BTS 108, which at least includes the bug identifier token along with other information pertaining to specific bug fixing commits. Fragile code identifier 104 may retrieve the code churn information directly from SCM 106 and BTS 108. The retrieval may be conducted for each source code within a repository of source code. In some examples, the retrieval may be conducted for multiple repositories of source code.

Fragile code identifier 104 may identify instances of churn data that are bug/defect-related. In some examples, fragile code identifier 104 may identify records of commits that are bug/defect-related. Fragile code identifier 104 may identify bug/defect-related churn data instances by correlating the code churn metrics from SCM 106 with the code churn information from BTS 108. More specifically, fragile code identifier may compare entries representing instances in the code churn metrics with a bug tracking record from the code churn information and identify entries in the code churn metrics that are associated with an entry in the bug tracking record. Identifying instances of churn data that are bug/defect-related may also include counting the identified bug/defect-related churn data instances. In some examples, this operation may include at least comparing the bug identifier token with an entry within the code churn metrics. In some examples, fragile code identifier 104 may exclude entries within the code churn metrics that are associated with feature addition commits, instead of identifying bug/defect-related churn data instances.

Identification of instances of churn data that are bug/ defect-related may be completed for each source code within a repository of source code. Fragile code identifier 104 may generate a data structure (as described in FIG. 2 below) that at least includes a number of bug/defect-related churn data instances for each source file. In some examples, the data structure at least includes a number of bug/defect-related churn data instances for each source line. The data structure may be a matrix or an array. In some examples, the matrix may not be in a human-readable format. In some examples, the matrix may be in a human-readable format and may be reported to the user.

Fragile code identifier 104 may then identify the number of bug/defect-related churn data instances associated with each source code line. The fragile code identifier 104 may review the filtered code churn metrics from the source code, and correlate the filtered code churn metrics with the associated code churn information from BTS 108 in order to identify the bug/defect-related churn data instances for each line of code. In some examples, fragile code identifier 104 may identify the number of bug/defect-related commit records associated with each source code line.

Fragile code identifier 104 may create a data structure (as described in FIG. 3 below) including individual lines of code and the number of bug/defect-related churn data instances. The data structure is usually in a form of a matrix, but may also be in an array, that may at least include individual lines of code (rows) and the number of bug/defect-related churn data instances (column). Fragile code identifier 104 may be pre-programmed to create a data structure with additional categories of information (columns). In other examples, the individual lines of code are columns and the number of bug/defect-related churn data instances are rows. In some examples, the user may program the categories of information on the data structure. In some examples, the matrix may not be in a human-readable format. In some examples, the matrix may be in a human-readable format and may be reported to the user.

Fragile code identifier 104 may then cluster data representing a source code line with consecutive/neighboring source code lines based on some statistical analysis(es). In one example, the fragile code identifier 104 may calculate a standard deviation value of bug/defect-related churn data instances associated with each line of the source code as a rule to cluster the consecutive/neighboring source code lines. In this example, for each source code line, the fragile code identifier 104 calculates the difference between the number of bug/defect-related churn data instances associated with the source code line and the consecutive/neighboring source code line. Fragile code identifier 104 then compares the calculated difference and the standard deviation value. If the absolute value of the calculated difference is less than or equal to the standard deviation value, the consecutive/neighboring source code line is added to a cluster that includes the source code line. Otherwise, if the absolute value of the calculated difference is greater than the standard deviation value, the cluster that includes the source code line is complete and a new cluster is formed for the consecutive/neighboring source code line. This calculation and comparison is completed for each source code line. The above methods of using standard deviation is exemplified in more detail below using FIG. 3 as a reference. Indeed, in this example, the fragile code identifier 104 immediately creates a cluster that includes at least the first source code line. In some examples, fragile code identifier 104 may cluster data associated with these lines of code to create a single "line" data that includes multiple lines of code. In some examples, the threshold value that determines whether lines are clustered may be preprogrammed within fragile code identifier 104. In some examples, the threshold value may be selected by the user. In some examples, an algorithm other than standard deviation may be used as criteria to cluster the lines of code.

Fragile code identifier 104 may rank the clusters of data. Usually, fragile code identifier 104 prioritizes clusters of data representing source code lines with greater average number of bug/defect-related churn data instances. In one example, the ranking is based on the average number of records of bug/defect-related commits per line. Fragile code identifier 104 may also prioritize larger clusters, i.e. the larger number of source code lines forming a cluster. For example, two clusters have an average number of bug/defect-related churn data instances of four instances per line. However, one cluster comprises three lines, while the cluster of lines comprises six lines. In this example, the fragile code identifier 104 will prioritize the cluster with six lines because this cluster includes a greater number of source code lines. In other examples, the size of the cluster may be a variable in a formula used to rank the clusters. Here, the formula may allocate points to each number of bug/defect-related churn data instances, but may also associate points to the number of source code lines forming a cluster. Thus, a larger cluster containing many lines of code with smaller average number of bug/defect-related churn data instances per line may be ranked higher than a smaller cluster of lines of code with greater average number of bug/defect-related churn data instances. In some examples, the fragile code identifier 104 may compare the average number of bug/defect-related churn data instances to a threshold value. Here, clusters with average numbers of bug/defect-related churn data instances not exceeding the threshold value may be ignored and are not ranked. The threshold value may be pre-coded onto fragile code identifier 104. In some examples, the threshold value may be user-defined.

Fragile code identifier 104 may generate a report identifying clusters that are representing possible fragile areas of a source code and provide the report to compiler 102. The numbers of bug/defect-related churn data instances may also be reported to the user. As previously stated, the selection of clusters for reporting may be based on the clusters with the most recorded bug/defect-related churn data instances or clusters that exceeded the threshold value of bug/defect-related churn data instances. The provided report may be in a form of a data structure with clustered entries that at least include the associated number of bug/defect-related churn data instances or a bar graph. The reporting may be in a form of a machine readable report or a human readable report, such as a chart or a list, that specifies potentially fragile sections of code. In one example, the output may be in a form of a data structure. The report may be sent to or retrieved by compiler 102 in order to facilitate the methods described herein.

FIG. 2 illustrates an example matrix 200 reporting the number of bug/defect-related churn data instances by file name within a repository of source code in accordance with examples of the technology disclosed herein. The example matrix 200 is provided for illustrative purposes only and should not be interpreted as limiting the scope of the claims to only the depicted example. In this example, bug/defect-related churn data instances are identified for a repository of source code. Matrix 200 may include various categories of information (columns) for individual source code (rows). In some examples, the categories of information may be user defined. In other examples, the categories of information may be modified by the user.

Here, the list of source files 202 may be identified in the first column. As mentioned previously, the list of source files 202 may be extracted from SCM 106 during initial review of the repository of source code. The remaining categories of information may include number of bugs 204, number of request for enhancements (RFE) 206, number of stories 208, number of sub-tasks 210, number of tasks 212, total number of events 214, and percent of churn data that were bug/defect fixes 216.

Along with the listed columns of information, the matrix 200 may include additional information. Additional information may include the total number of churn data reported by SCM 106 in order to calculate the percent of bug changes. In the example matrix, the percent of churn data that were bug fixes 216 for LoopAutoThreadInfo.cpp was found to be 0.98 percent because the fragile code identifier 104 calculated 4,000 bugs (not shown) to exist within a repository of files within the SCM 106 and the fraction of 39 bug/defect-related churn data instances divided by 4,000 bugs results in 0.98 percent of churn data being bug/defect-related churn data instances for the LoopAutoThreadInfo.cpp source code. The list of source code may be ordered by the number of bug/defect-related churn data instances. The example matrix may be ordered by the percent of churn data that were bug fixes 216. However, many examples may sort the matrix by the number of bugs 204.

Figure 3:
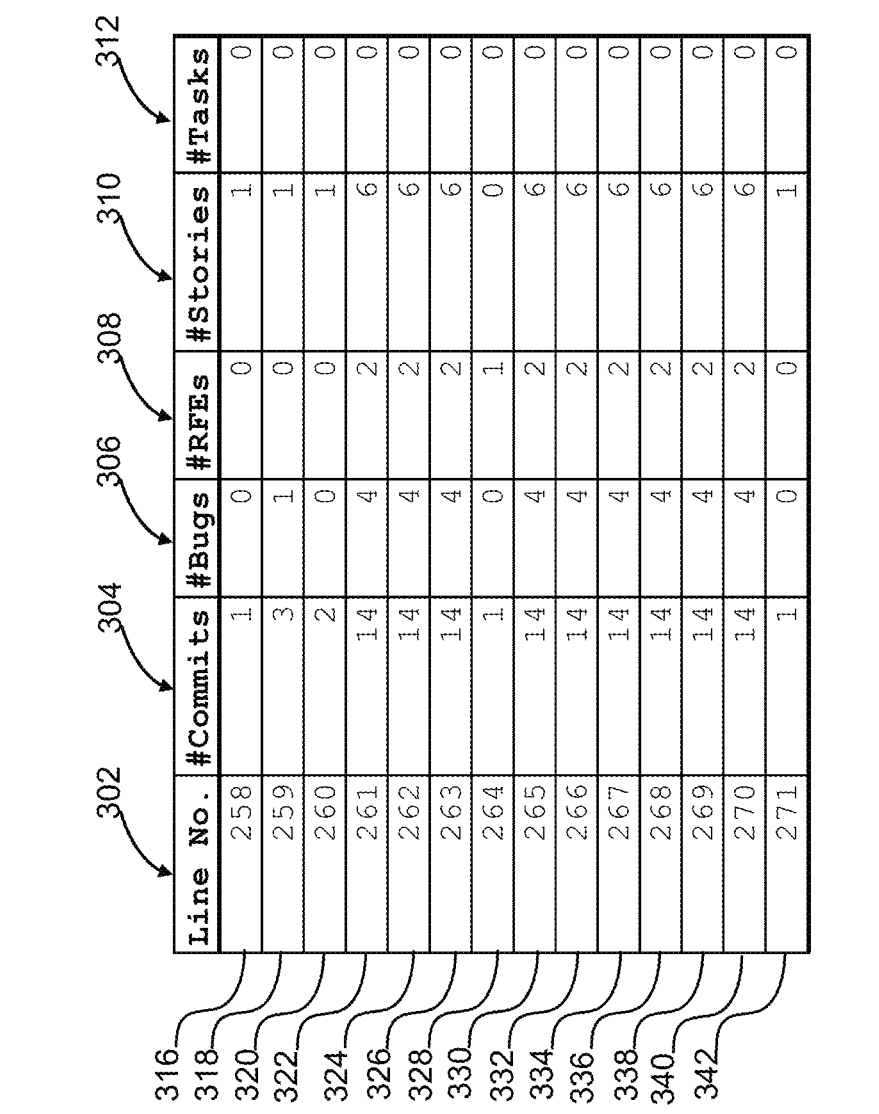
FIG. 3 illustrates an example matrix including line-by-line reporting of the number of bug/defect-related churn data instances in accordance with examples of the technology disclosed herein.

FIG. 3 illustrates an example matrix 300 including line-by-line reporting of the number of bug/defect-related churn data instances in accordance with examples of the technology disclosed herein. The example matrix 300 is provided for illustrative purposes only and should not be interpreted as limiting the scope of the claims to only the depicted example. In this example, matrix 300 is in a form of human-readable format. Matrix 300 may include entries that are organized by individual line of code 302. For every source code line, each entry may represent a number of commits 304, number of bugs 306, number of RFEs 308, number of stories 310, and number of tasks 312. For example, line number 263 (326) may have 14 commits, 4 bugs, 2 RFEs, 6 stories and 0 tasks. In some examples, additional categories of information may be included within the matrix.

An example that clusters lines using standard deviation as the clustering rule is depicted below using FIG. 3. For this example, assume that the standard deviation value for the number of bug/defect-related churn data instances based on every line of a source code is 1.89. FIG. 3 depicts the number of bug/defect-related churn data instances associated with line numbers 258 (316) through 271 (342). Assume further that line 258 (316) is a start of a new cluster. Fragile code identifier 104 will calculate the difference between the number of bug/defect-related churn data instances of lines 259 (318) and 258 (316). The absolute value of the calculated difference is 1, which is less than the standard deviation value of 1.89, and therefore fragile code identifier 104 creates a cluster that includes lines 258 (316) and 259 (318). The same calculation and comparison are performed between lines 260 (320) and 259 (318). Here, the absolute value of the difference between the number of bug/defect-related churn data instances for lines 260 (320) and 259 (318) is 1. Since the absolute value of the difference is less than the standard deviation value, line 260 (320) is added to the cluster containing lines 258 (316) and 259 (318). Next, the same calculation and comparison are performed for lines 261 (322) and 260 (320). Here, absolute value of the difference is 4, which is greater than the standard deviation value of 1.89. Therefore, a new cluster is formed that includes line 261 (322). The same calculation and comparison are completed for the remaining lines. In this example, FIG. 3 depicts a scenario in which five clusters are formed between lines 258 (316) and 271 (342). The first cluster includes lines 258 (316) through 260 (320). The second cluster includes lines 261 (322) through 263 (326).

The third cluster includes line 264 (328). The fourth cluster includes lines 265 (330) through 270 (340). Finally, the fifth cluster includes line 271 (342).

The process described above may be repeated for every source code within a repository of source. In some examples, the process described above may be repeated for multiple repositories of source code.

Figure 4:
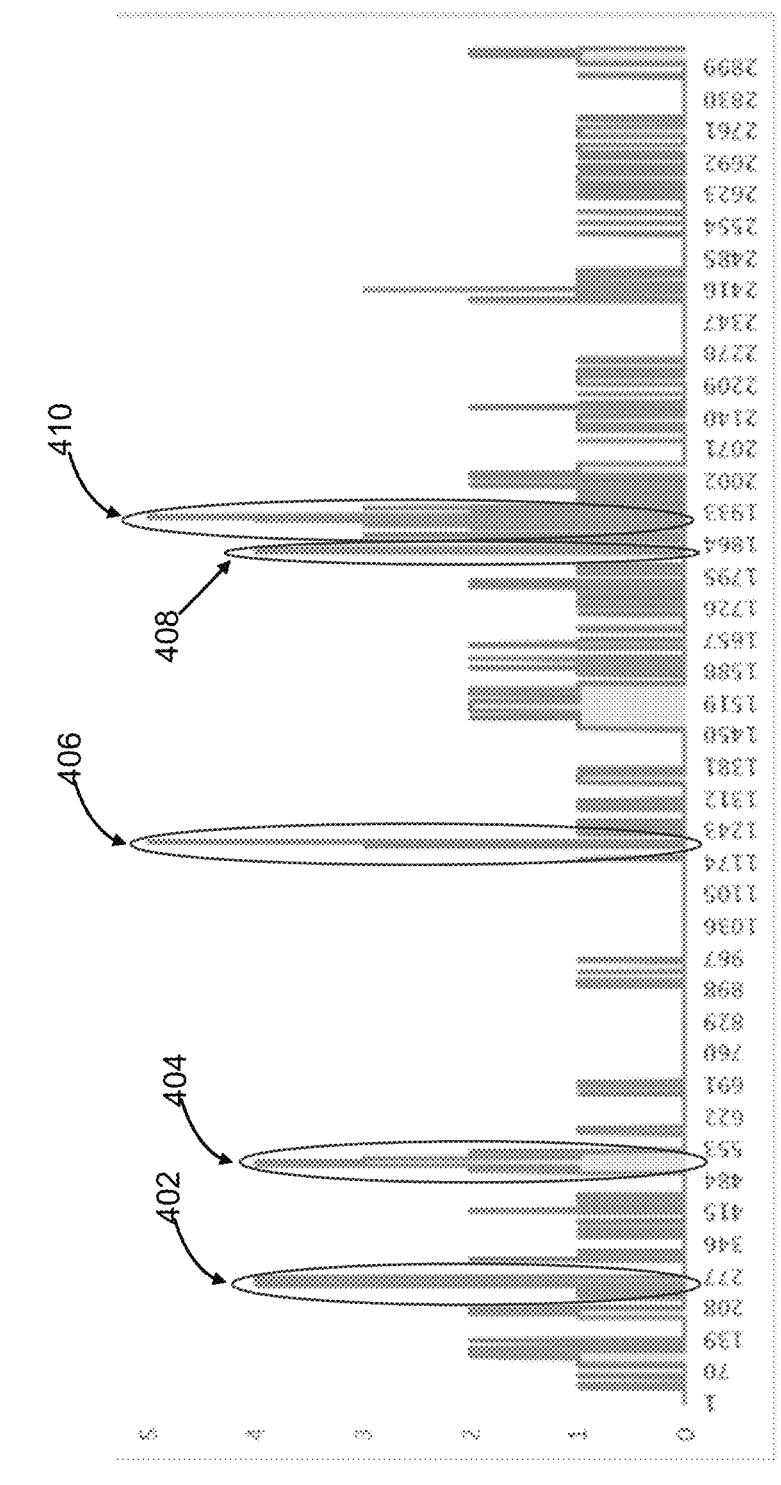
FIG. 4 illustrates an example bar graph of the number of bug/defect-related churn data instances for each cluster in accordance with examples of the technology disclosed herein.

FIG. 4 illustrates an example bar graph 400 of the number of bug/defect-related churn data instances for each cluster in accordance with examples of the technology disclosed herein. The example bar graph 400 is provided for illustrative purposes only and should not be interpreted as limiting the scope of the claims to only the depicted example. The bar graph 400 may be organized as the number of bug/defect-related churn data instances (y-axis) versus the line on which the bug/defect-related churn data instances is located (x-axis). The created bar graph may be provided to the user in a human-readable format. In some examples, the bar graph is not generated and fragile code identifier 104 may provide a list of potentially fragile lines of code. If the bar graph is provided, clusters may be marked or otherwise identified. Clusters 402, 404, 406, 408, and 410 may be highlighted (as shown) and provided to the user. In this example, fragile code identifier 104 may seek clusters with the two largest numbers of bug/defect-related churn data instances per line, which may be five and four bug/defect-related churn data instances per line. Fragile code identifier 104 may provide the lines associated with each cluster and may also provide the number of bug/defect-related churn data instances. In some examples, the threshold number of bug/defect-related churn data instances may be user assigned. In this scenario, the user may specify a value of bug/defect-related churn data instances per line, such as four, and the fragile code identifier 104 will provide all clusters that were measured having four or more bug/defect-related churn data instances per line.

FIG. 5 illustrates an example computing device in accordance with examples of the technology disclosed herein. Computing device 500 includes hardware processors 502. In various examples, hardware processors 502 may include one or more processors.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-514, to control processes or operations for identifying fragile sections of a source code among a repository of source code. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Non-limiting examples include flash memory, solid state storage devices (SSDs); a storage area network (SAN); removable memory (e.g., memory stick, CD, SD cards, etc.); or internal computer RAM or ROM; among other types of computer storage mediums. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 504 may be a non-transitory storage medium, where the term "non-transitory" does not encompass transitory propagating signals. As described in detail below, machine-readable storage medium 706/708 may be encoded with executable instructions, for example, instructions 506-514.

Hardware processor 502 may execute instruction 506 to activate compiler, such as compiler 102. In certain examples, hardware processor 502 may execute this operation in response to user input, such as through running a "gcc" command in Command Prompt. In other examples, the execution of this operation may be initiated in response to the elapsing of preprogrammed or programmed intervals. In this example, the elapsing of time triggers activation of compiler 102 through a separate application recognizing the elapsing of time and running a "gcc" command for applicable source code. Here, the applicable source code may be predetermined by the user or may be preprogrammed within the separate application. In some examples, the activation of compiler 102 may be premised on an event, such as when a source code in a repository was edited.

Activation of compiler 102 usually includes compiler 102 receiving a reference to a source code and compiler 102 initiating lexical analysis. In some examples, such as when compiler 102 is activated after elapse of time, compiler 102 refers to the report (referenced later in instruction 510) generated by fragile code detector 104 to identify source code that will be compiled from a list of source code and initiate lexical analysis on a listed source code. In this example, compiler 102 will either remain on standby until the report is provided or retrieves the report that lists the source code requiring sanitizer review. Accordingly, instruction 510 may be completed in prior to instruction 508.

Hardware processor 502 may execute instruction 508 to generate a control flow graph comprising nodes and edges. In some examples, hardware processor 502 may execute this operation as part of the normal compilation process performed by compiler, such as compiler 102, during the intermediate representation phase. More specifically, first, compiler 102 partitions the source code into sets of basic blocks where a basic block is a straight-line piece of code without any jumps to other nodes in the interim. Next, compiler 102 identifies edges that are used to represent jumps in the control flow, i.e., code flow flowing from one node to another. An example of a jump is an if condition existing at the end of a basic block, where the code flow would "jump" upon certain conditions. An example control flow graph is depicted on FIG. 6 and is described in more detail below.

Hardware processor 502 may execute instruction 510 to identify suspect source code ranges within a code to be tested based on fragile code segments of the code. In some examples, compiler 102 retrieves a list of fragile code sections from fragile code identifier 104. The aforementioned list may be a data structure, such as a matrix or an array, where the process of formation was previously described above. In some examples, the list contains ranked clusters of sections that is ordered by code fragility, where the ordering at least considers the number of instances of bug/defect churn data or the number of commit records. In some examples, the list includes sections that experienced numbers of instances of bug/defect churn data or commit records that exceed a threshold value. In this example, compiler 102 may consider all listed sections as suspect source code ranges. In some examples, compiler 102 identifies as suspect source code ranges a limited number of source code ranges, such as the top three clusters.

In some examples, compiler, such as compiler 102, conducts the operations conducted by fragile code identifier 104, which includes interacting with SCM 106 and BTS 108 to identify the fragile ranges of code. Instruction 510 may further include instructions such as identifying instances of churn data that are bug/defect-related churn data; identifying the number of bug/defect-related churn data instances associated with each source code line; clustering data of source code lines based on the number of associated bug/defect-related churn data instances; and ranking the clusters.

Hardware processor 502 may execute instruction 512 to flag as susceptible, nodes associated with a source code location within the suspect source code ranges. In some examples, compiler, such as compiler 102, will correlate the source location of nodes of a control flow graph to the identified fragile ranges of code. Compiler 102 may flag the nodes where its source location is from a fragile range of code. In some examples, flagging the node may be modifying a setting in the code to signify the block of code is "marked" as susceptible. Instruction 512 may include instruction to enable control flow that passes through the marked nodes for sanitizer instrumentation. More specifically, a condition of its control flow statement may be set as "false" to prevent passing of instrumented code flow. In some examples, application, such as application 112 flags the nodes and marks the control flow, wherein compiler 102 provides the control flow graph with the associate source code location for each node and a fragile code identifier 104 provides the suspect source code ranges to the application. In some examples, compiler 102 assumes by default every node in the CFG as susceptible and every control flow as enabled or susceptible code flow for sanitizer instrumentation and compiler 102 unflags the non-fragile nodes and disables control flow for sanitizer instrumentation.

Hardware processor 502 may execute instruction 514 to run the sanitizer instrumentation on only the nodes flagged as being susceptible. A user or compiler 102 may prompt for code instrumentation and execution. Prior to running the instrumented code, instruction 514 may further include steps to build the code. It is commonly understood that sanitizers comprise two components; a compile-time component and a runtime component. The compile-time component supports the "instrumentation" of the code, i.e., additional code is inserted to the object code, allowing the runtime sanitizer to pass instrumented code to check for various conditions. The insertion of additional code occurs during the code building phase, which is often referred to as the code generation phase. During a normal code building phase for a code instrumented with a sanitizer, all control flow is instrumented, which allows the sanitizer to analyze for every possible error. However, here, compiler 102 recognizes code flow that is enabled for sanitizer instrumentation and instruments the code flow on limited basis. The built code is an executable code with sanitizer instrumentation on only susceptible code flow enabled for sanitizer instrumentation. Finally, the executable code is executed using the runtime sanitizer and the sanitizer checks for runtime errors for only the instrumented code previously enabled for instrumentation based on fragility of the source code.

Figure 6:
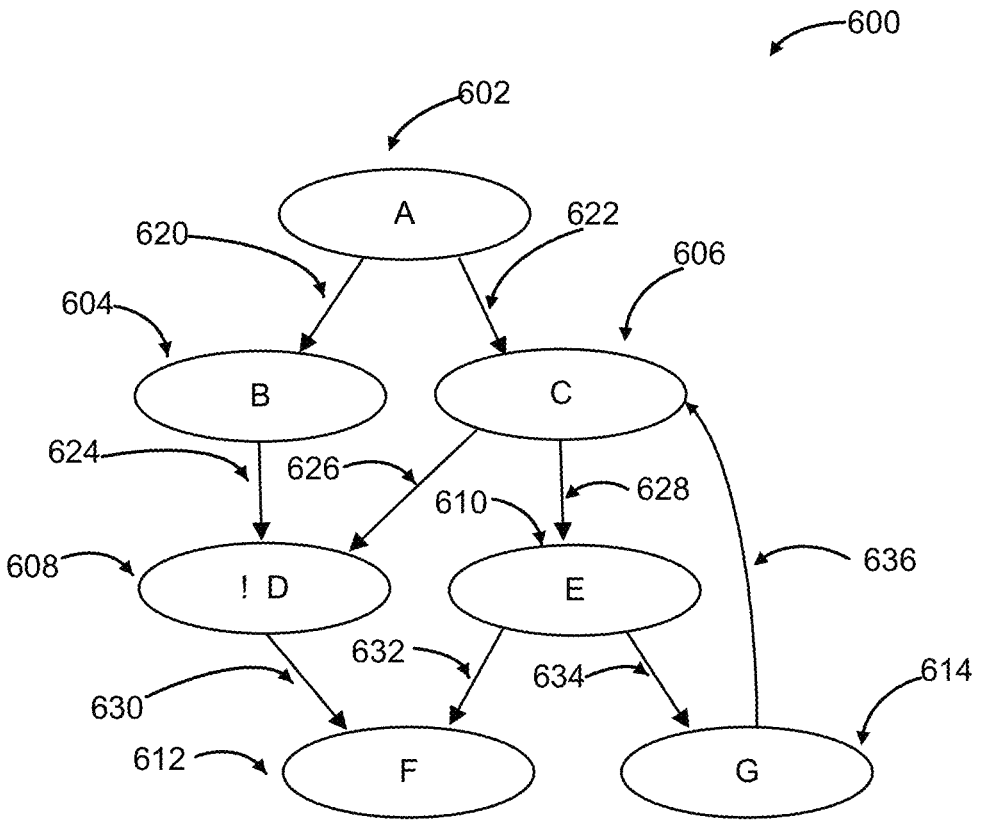
FIG. 6 illustrates an example control flow graph in accordance with examples of the technology disclosed herein.

FIG. 6 illustrates an example control flow graph 600 in accordance with examples of the technology disclosed herein. As described above, a control flow graph comprises nodes and edges. A node is a basic block of code, i.e., a straight-line piece of code without any jumps to other nodes or other lines of code in the interim. An edge represents a jump in the control flow, i.e., code that triggers code flow to "jump" from one node to another, such as an "if" statement with two results.

The example control flow graph 600 illustrated at FIG. 6 is made up of nodes A (602), B (604), C (606), D (608), E (610), F (612), and G (614) and edges 620-636. The seven nodes represent consecutive lines of code that contain no jumps. Here, node A (602) has two edges extending out of the node. This characteristic infers a conditional statement (such as an if statement) that has two outcomes where based on certain conditions, code flow is directed to node B (604) or C (606). Edges 620 and 622 pass the code flow based on the outcome of the condition. Next, node B (604) may receive code flow and the code flow jumps to node D (608) through edge 624. Similarly, node C (606) may receive code flow and the code flow may jump to either node D (608) or node E (610) based on a condition present at the end of the straight-line piece of code making node C (606). Code flow that jumped to node D (608) will jump to node F (612) through edge 630 and similarly, code flow that jumped to node E (610) may jump to either node F (612) or node G (614). The straight-line code forming node G (614) may end with a do-while loop condition that passes code flow to node C for repeated processing. In this example, node F (612) and G (614) are the last nodes in the control flow graph 600 that may terminate the execution of code. Each possible flow of code from node A (602) to nodes F (612) and G (614) are referred to as control flows.

As depicted on FIG. 6, node D (608) is emphasized with an exclamation mark to signify its source as a reported fragile section of code. Accordingly, control flow passing through node D (608) are treated as susceptible code flow and enabled for sanitizer instrumentation. Here, the control flows from node A (602), B (604), D (608), and F (612) and A (602), C (606), D (608), and F (612) are enabled for sanitizer instrumentation. Therefore, the code flows forming these control flows are instrumented and enabled by the compile-time sanitizer and the runtime sanitizer will, in some examples, only pass instrumented code through the enabled code flow while ignoring the remaining code flow and more widely the ignoring the remaining control flows.

Figure 7:
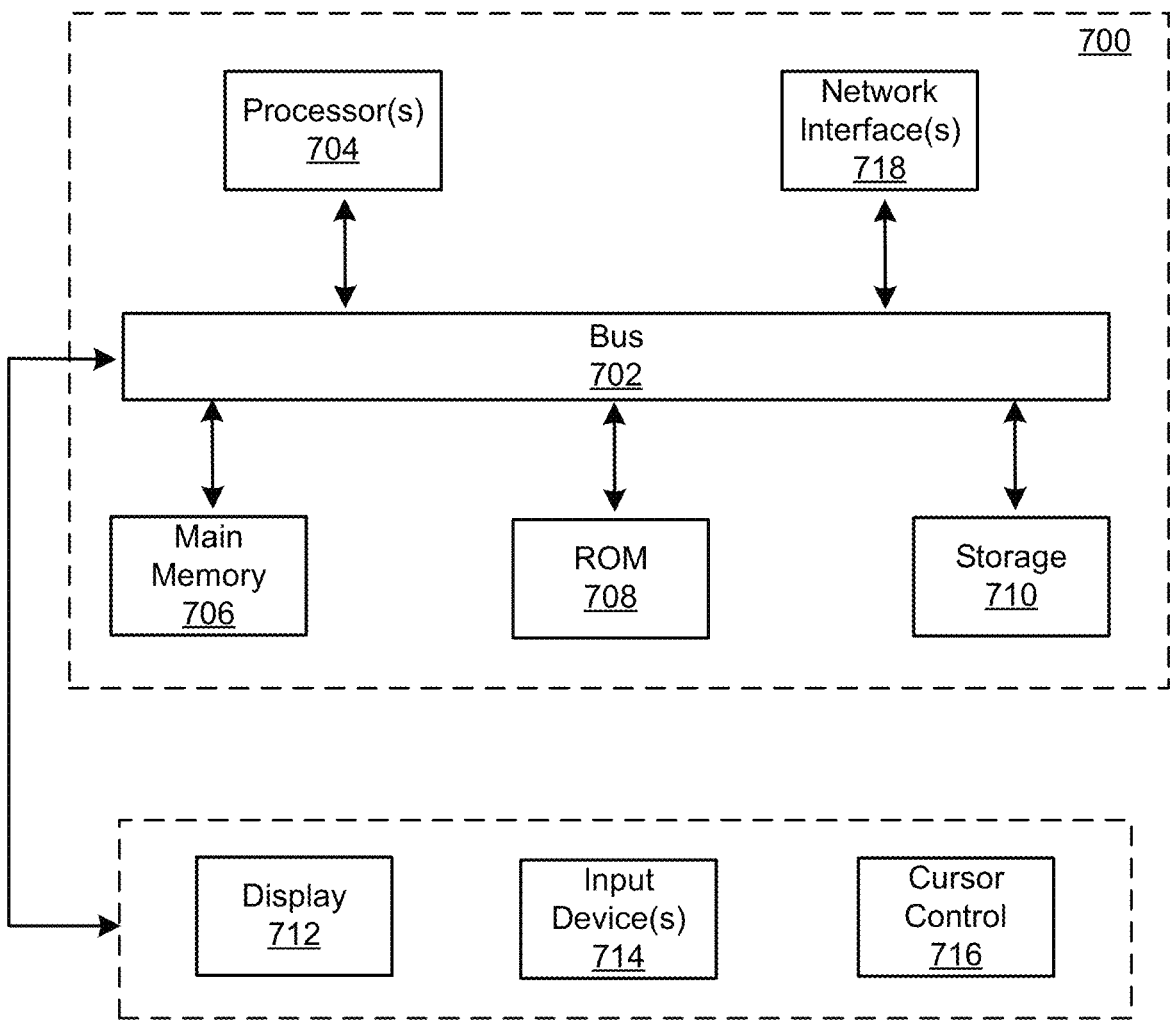
FIG. 7 illustrates a block diagram of an example computer system 800 in accordance with examples of the technology disclosed herein.

FIG. 7 illustrates a block diagram of an example computer system 700 in accordance with examples of the technology disclosed herein. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random-access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some examples, the same direction information and command selections as cursor control may be implemented via receiving touches on a touch screen without a cursor. The computing system 700 may include a user interface module to implement a GUI that may be stored in a mass storage device as executable software codes that are executed by the computing device(s).

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device.

The computer system 700 may implement the techniques described herein using customized hard-wired logic, one or more ASICs or FPGAs, firmware and/or program logic which in combination with the computer system causes or programs computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media.

Non-transitory media is distinct from but may be used in conjunction with transmission media. Transmission media participates in transferring information between non-transitory media.

The computer system 700 also includes a communication interface 718 coupled to bus 702. Communication interface 718 provides a two-way data communication coupling to one or more network links that are connected to one or more local networks. Wireless links may also be implemented. In any such implementation, network interface 818 sends and receives electrical, electromagnetic or optical signals that carry digital data streams representing various types of information.

The computer system 800 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
identifying instances of bug/defect-related churn data associated with a source code file;
identifying a number of bug/defect-related churn data instances associated with each source code line of the source code file;
clustering data within a data structure representing the source code line with data representing consecutive source code line of the source code file to form a clustered data representing source code lines based on similarity of numbers of bug/defect-related churn data instances associated with the consecutive source code line;
ranking the clusters of data:
wherein the ranking of the clusters is at least based on the numbers of bug/defect-related churn data instances;
selecting highest ranked clusters of data as suspect source code ranges;
generating a control flow graph comprising nodes and edges;
flagging as susceptible, those nodes associated with a source code location within the suspect source code ranges; and
running a sanitizer on the nodes flagged as being susceptible.

2. The method of claim 1, wherein generating the control flow graph comprising nodes and edges is part of a normal compilation process.

3. The method of claim 1, wherein flagging as susceptible, those nodes associated with the source code location within the suspect source code ranges comprises marking control flow passing through the flagged nodes as susceptible code flow and enabled for sanitizer instrumentation.

4. The method of claim 3, wherein instrumenting only the nodes flagged as being susceptible comprises adding sanitizer instrumentation into an executable code.

5. The method of claim 4, wherein instrumenting on only the nodes flagged as being susceptible comprises running the executable code with the sanitizer instrumentation enabled on only the control flow marked as susceptible code flow.

6. A method comprising:
identifying records of bug/defect-related commits associated with a source code file;
identifying a number of bug/defect-related commit records associated with each source code line of the source code file;
clustering data within a data structure representing the source code line with data representing consecutive source code line of the source code file to form a clustered data representing source code lines based on similarity of numbers of bug/defect-related commit records associated with the consecutive source code line;
ranking the clusters of data:
wherein the ranking of the clusters is at least based on the numbers of bug/defect-related commit records;
selecting highest ranked clusters of data as suspect source code ranges;
generating a control flow graph comprising nodes and edges;
flagging as susceptible, those nodes associated with a source code location within the suspect source code ranges; and
instrumenting on the nodes flagged as being susceptible.

7. The method of claim 6, wherein generating the control flow graph comprising nodes and edges is part of a normal compilation process.

8. The method of claim 6, wherein flagging as susceptible, those nodes associated with the source code location within the suspect source code ranges comprises marking control flow passing through the flagged nodes as susceptible code flow and enabled for sanitizer instrumentation.

9. The method of claim 8, wherein instrumenting only the nodes flagged as being susceptible comprises building the sanitizer into an executable code.

10. The method of claim 9, wherein instrumenting on only the nodes flagged as being susceptible comprises running the executable code with the sanitizer instrumentation enabled on only the control flow marked as susceptible code flow.

11. A computer system comprising:

a processor; and a memory including instructions that, when executed by the processor, cause the processor to:

identify instances of bug/defect-related churn data associated with a source code file;

identify a number of bug/defect-related churn data instances associated with each source code line of the source code file;

cluster data within a data structure representing the source code line with data representing consecutive source code line of the source code file to form a clustered data representing source code lines based on similarity of numbers of bug/defect-related churn data instances associated with the consecutive source code line;

rank the clusters of data:

wherein the ranking of the clusters is at least based on the numbers of bug/defect-related churn data instances;

select highest ranked clusters of data as suspect source code ranges;

generate a control flow graph comprising nodes and edges;

flag as susceptible, those nodes associated with a source code location within the suspect source code ranges; and run a sanitizer on the nodes flagged as being susceptible.

12. The computer system of claim 11, wherein generating the control flow graph comprising nodes and edges is part of a normal compilation process.

13. The computer system of claim 11, wherein flagging as susceptible, those nodes associated with the source code location within the suspect source code ranges comprises marking control flow passing through the flagged nodes as susceptible code flow and enabled for sanitizer instrumentation.

14. The computer system of claim 13, wherein instrumenting only the nodes flagged as being susceptible comprises adding sanitizer instrumentation into an executable code.

15. The method of claim 14, wherein instrumenting on only the nodes flagged as being susceptible comprises running the executable code with the sanitizer instrumentation enabled on only the control flow marked as susceptible code flow.

* * * * *